United States Patent [19]
Moskovich

[11] Patent Number: 5,969,874
[45] Date of Patent: Oct. 19, 1999

[54] LONG FOCAL LENGTH PROJECTION LENSES

[75] Inventor: Jacob Moskovich, Cincinnati, Ohio

[73] Assignee: U.S. Precision Lens Incorporated, Cincinnati, Ohio

[21] Appl. No.: 08/896,298

[22] Filed: May 16, 1997

Related U.S. Application Data

[60] Provisional application No. 60/018,657, May 30, 1996.

[51] Int. Cl.$^6$ .............................. G02B 3/00; G02B 15/14; G02B 9/12
[52] U.S. Cl. ........................ 359/651; 359/649; 359/689; 359/716; 359/784; 359/791
[58] Field of Search ................................... 359/649–651, 359/716, 791, 689, 784

[56] References Cited

U.S. PATENT DOCUMENTS

| | | |
|---|---|---|
| 4,189,211 | 2/1980 | Taylor . |
| 4,425,028 | 1/1984 | Gagnon et al. . |
| 4,461,542 | 7/1984 | Gagnon . |
| 4,530,575 | 7/1985 | Yamakawa ............................... 359/650 |
| 4,815,831 | 3/1989 | Betensky . |
| 4,826,311 | 5/1989 | Ledebuhr . |
| 4,900,139 | 2/1990 | Kreitzer . |
| 4,963,007 | 10/1990 | Moskovich . |
| 5,042,929 | 8/1991 | Tanaka et al. . |
| 5,179,473 | 1/1993 | Yano et al. . |
| 5,200,861 | 4/1993 | Moskovich . |
| 5,218,480 | 6/1993 | Moskovich . |
| 5,278,698 | 1/1994 | Iizuka et al. . |
| 5,309,283 | 5/1994 | Kreitzer . |
| 5,313,330 | 5/1994 | Betensky . |
| 5,331,462 | 7/1994 | Yano . |
| 5,455,713 | 10/1995 | Kreitzer . |
| 5,493,446 | 2/1996 | Nakajima .................................. 359/650 |
| 5,625,495 | 4/1997 | Moskovich . |
| 5,808,804 | 9/1998 | Moskovich . |
| 5,870,228 | 2/1999 | Kreitzer et al. .......................... 359/649 |

FOREIGN PATENT DOCUMENTS 311116  12/1989  European Pat. Off. .

OTHER PUBLICATIONS

*The Handbook of Plastic Optics*, U.S. Precision Lens, Inc., Cincinnati, Ohio, 1983, pp. 17–29.

*Primary Examiner*—Georgia Epps
*Assistant Examiner*—Evelyn A. Lester
*Attorney, Agent, or Firm*—Maurice M. Klee

[57] ABSTRACT

A projection lens for use with LCD or DMD panels is provided. The lens has three lens units, the first unit having a weak power, at least one aspheric surface, a high dispersion negative lens element, and a low dispersion positive lens element, the second lens unit having a positive power, and the third lens unit having a negative power and an overall meniscus shape. The projection lens satisfies the following relationships:

$$0.3 > D_{23}/f_0 > 0.1,$$

$$|f_1|/f_0 > 1.3, \text{ and}$$

$$BFL/f_0 > 0.3$$

where (i) $f_0$ is the effective focal length of the combination of the first, second, and third lens units; (ii) $f_1$ is the effective focal length of the first lens unit; (iii) $D_{23}$ is the distance between the second and third lens units; and (iv) BFL is the back focal length of the combination of the first, second, and third lens units for an object located at infinity along the long conjugate side of the projection lens.

18 Claims, 4 Drawing Sheets

Fig. 4

LONG FOCAL LENGTH PROJECTION LENSES

CROSS REFERENCE TO RELATED PROVISIONAL APPLICATION

This application claims the benefit under 35 USC §119(e) of U.S. Provisional Application Ser. No. 60/018,657 filed May 30, 1996.

FIELD OF THE INVENTION

This invention relates to projection lenses and, in particular, to projection lenses which can be used, inter alia, to form an image of an object composed of pixels, such as, a LCD or DMD.

BACKGROUND OF THE INVENTION

Figure 4:
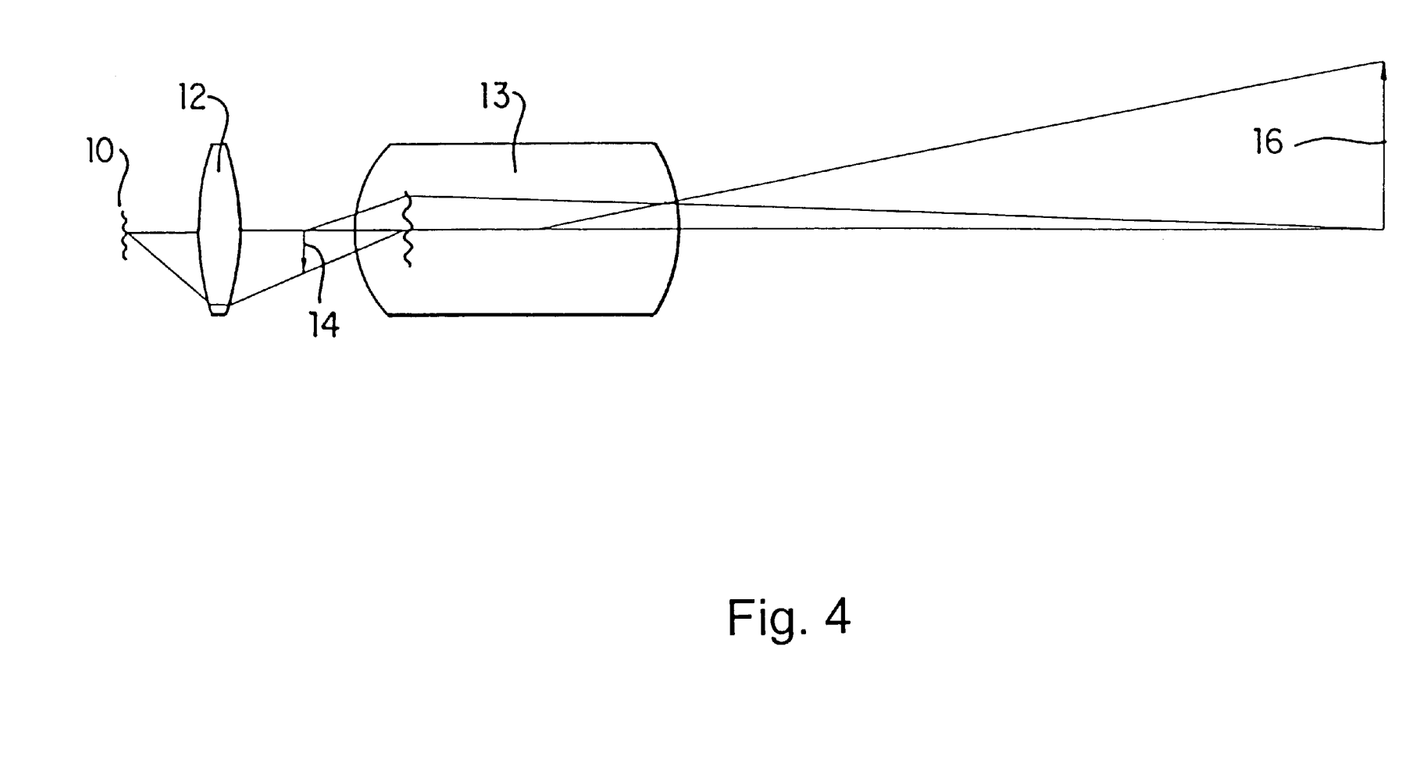
FIG. 4 is a schematic diagram showing an overall projection lens system in which the projection lens of the present invention can be used.

Projection lens systems (also referred to herein as "projection systems") are used to form an image of an object on a viewing screen. The basic structure of such a system is shown in FIG. 4, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels), and 13 is a projection lens, composed of multiple lens elements, which forms an enlarged image of object 14 on viewing screen 16. The system can also include a field lens, e.g., a Fresnel lens, in the vicinity of the pixelized panel to direct the exit pupil of the illumination system towards the entrance pupil of the projection lens.

FIG. 4 is drawn for the case of a LCD panel where the output of the illumination system strikes the back of the panel and passes through those pixels of the panel which are transparent. DMDs, on the other hand, work by reflection and thus the output of the illumination system is routed to the front of the panel by a prism or similar device.

Projection lens systems in which the object is a pixelized panel are used in a variety of applications, including data display systems. Such projection lens systems preferably employ a single projection lens which forms an image of either a single panel having, for example, red, green, and blue pixels, or three individual panels, one for each color. In some cases, two panels are used, one for two colors, e.g., red and green, and the other for one color, e.g., blue. A spinning filter wheel or similar device is associated with the panel for the two colors and the panel is alternately fed information for the two colors in synchrony with the rotating filter.

There exists a need for a projection lens for use with a pixelized panel which simultaneously has at least the following properties: (1) a long focal length; (2) a long back focal length; (3) the ability to operate at various magnifications while maintaining an efficient coupling to the output of the illumination system and a high level of aberration correction; (4) a relatively small size, including a small number of lens elements, a relatively small barrel length, and a relatively small maximum lens diameter; (5) a high level of color correction; (6) low distortion; and (7) low sensitivity to temperature changes.

A long focal length is needed for projection systems which are to be used in theaters, conference halls, and the like. In such settings, the projection system is typically located at the back of the hall so that the throw distance from the lens to the viewing screen is long. For a given panel size and screen size, i.e., a given magnification, the longer the focal length, the longer the throw distance. Accordingly, for a given range of magnifications, the focal length of the lens must increase as the throw distance increases.

A long back focal length, i.e., the distance from the last lens surface to the pixelized panel, is needed, especially where multiple panels are used, to accommodate the optical elements, e.g., filters, beam splitters, prisms, and the like, used in combining the light from the different color optical paths which the lens system projects towards the viewing screen. In addition, a long back focal length allows the output of the illumination system to be in the vicinity of the projection lens for output distances which are relatively large. Relatively large output distances are desirable since they provide relatively shallow entrance angles for the light at the pixelized panel which is especially important in the case of LCD panels.

A projection lens which can efficiently operate at various magnifications is desirable since it allows the projection system to be used with screens of different sizes and halls of different dimensions without the need to change any of the components of the system. Only the object and image conjugates need to be changed which can be readily accomplished by moving the lens relative to the pixelized panel. The challenge, of course, is to provide efficient coupling to the output of the illumination system and a high level of aberration correction throughout the operative range of magnifications.

A relatively small projection lens is desirable from a cost, weight, and size point of view. Large numbers of lens elements and elements having large diameters consume more raw materials, weigh more, and are more expensive to build and mount. Long barrel lengths normally increase the overall size of the projection system, which again leads to increased cost and weight. Accordingly, a lens with a minimum number of relatively small lens elements, located relatively close to one another, is desired.

A high level of color correction is important because color aberrations can be easily seen in the image of a pixelized panel as a smudging of a pixel or, in extreme cases, the complete dropping of a pixel from the image. These problems are typically most severe at the edges of the field. In general terms, the color correction, as measured at the pixelized panel, should be better than about a pixel and, preferably, better than about a half a pixel to avoid these problems.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

It should be noted that color aberrations become more difficult to correct as the focal length of the projection lens increases. Thus, the first and fifth criteria discussed above, i.e., a long focal length and a high level of color correction, work against one another in arriving at a suitable lens design.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lenses of FIGS. 1–3 being, for example, designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. As described below, plastic elements can be used and temperature insensitivity still achieved provided the powers and locations of the plastic elements are properly chosen.

The projection lenses described below achieve all of the above requirements and can be successfully used in producing relatively low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Iizuka et al., U.S. Pat. No. 5,278,698, Betensky, U.S. Pat. No. 5,313, 330, and Yano, U.S. Pat. No. 5,331,462. Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311, 116.

SUMMARY OF THE INVENTION

In view of the foregoing, it is an object of the present invention to provide improved projection lenses for use with a pixelized panel which simultaneously have each of the seven desired properties discussed above. This object is achieved by means of a projection lens which comprises in order from its image side to its object side (i.e., from its long conjugate side to its short conjugate side):

(A) a first lens unit having a weak power and comprising a negative lens element composed of a high dispersion material and a positive lens element composed of a low dispersion material, said first lens unit having at least one aspheric surface;

(B) a second lens unit having a positive power; and (C) a third lens unit widely spaced from the second lens unit, said third lens unit having a negative power and an overall meniscus shape.

In certain preferred embodiments of the invention, the overall meniscus shape of the third lens unit includes a shorter radius surface and a longer radius surface, with the shorter radius surface facing the long conjugate (image side) of the projection lens.

In further preferred embodiments, the lens system satisfies at least some and preferably all of the following numerical limitations:

$$0.3 > D_{23}/f_0 > 0.1 \qquad (1)$$

$$|f_1|/f_0 > 1.3 \qquad (2)$$

$$BFL/f_0 > 0.3 \qquad (3)$$

where:

(i) $f_0$ is the effective focal length of the combination of the first, second, and third lens units;

(ii) $f_1$ is the effective focal length of the first lens unit;

(iii) BFL is the back focal length of the combination of the first, second, and third lens units for an object located at infinity along the long conjugate side of the projection lens; and (iv) $D_{23}$ is the distance between the second and third lens units measured from the last surface of the second unit to the first surface of the third unit.

In still further preferred embodiments, $|f_1|/f_0$ is greater than about 2.5, and $BFL/f_0$ is greater than about 0.4.

Limitations (1)–(2) relate to the physical structure of the projection lens. When these are satisfied, limitation (3) can be achieved while still achieving high levels of color correction and low levels of distortion.

In certain embodiments, the projection lenses of the invention are designed using the location of the output of the illumination system as a pseudo-aperture stop/entrance pupil of the projection lens (see Betensky, U.S. Pat. No. 5,313, 330, the relevant portions of which are incorporated herein by reference). In this way, efficient coupling is achieved between the light output of the illumination system and the projection lens. The projection lens of FIG. 1 was designed in this way.

In accordance with these embodiments, the invention provides a projection lens system which forms an image of an object and comprises:

(a) an illumination system comprising a light source and illumination optics which forms an image of the light source, said image being the output of the illumination system;

(b) a pixelized panel which comprises the object; and (c) a projection lens of the type described above, said projection lens having an entrance pupil whose location substantially corresponds to the location of the output of the illumination system.

In connection with other aspects of the invention, the magnification of the projection lens system is varied by changing the distance between the pixelized panel and the first, second, and third lens units while (a) holding constant the distance between the second and third lens units, and (b) varying the distance between the first lens unit and the second lens unit.

The projection lenses of the invention are also designed to be substantially athermal. As discussed fully below, this is done by employing plastic lens elements having similar positive and negative powers. In this way, changes in the power of the positive lens elements caused by temperature changes are compensated for by changes in the power of the negative lens elements, thus providing substantially constant overall optical properties for the projection lens as its temperature changes.

BRIEF DESCRIPTION OF THE DRAWINGS

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention have the general form of a corrector unit (unit 1) on the long conjugate side of a telephoto lens (units 2 and 3). Telephoto lenses typically have a half field of view of less than about 10°. By means of the corrector unit, the projection lenses of the invention have a much wider field of view, e.g., a half field of view greater than about 20°.

The first lens unit (corrector unit) has a weak power, at least one aspheric surface, and comprises a negative lens element composed of a high dispersion material and a positive lens element composed of a low dispersion material. Preferably, the first lens unit satisfies limitation (2) above. The negative and positive lens elements are preferably composed of plastic materials, although glass materials can be used if desired. However, to achieve thermal stability, if one of the lens elements is changed from plastic to glass, then both should be changed.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For plastic lens elements, the low and high dispersion materials of choice are acrylic and styrene, respectively. Other plastics can, of course, be used if desired. For example, in place of styrene, polycarbonates and copolymers of polystyrene and acrylic (e.g., NAS) having flint-like dispersions can be used. See *The Handbook of Plastic Optics*, U.S. Precision Lens, Inc., Cincinnati, Ohio, 1983, pages 17–29.

The first lens unit and, in particular, the aspheric surface (s) of that unit, contributes to the correction of the system's distortion which, as discussed above, needs to be highly corrected for lens systems used with pixelized panels. The distortion correction is generally better than about one percent at the image, and preferably better than about 0.5 percent. The aspheric surface(s) also contribute to the correction of spherical aberration, astigmatism, and coma. Color correction is achieved through the high dispersion negative element of the first unit in combination with the low dispersion positive element. The first lens unit also plays an important role in focusing of the lens system. In particular, the first lens unit is moved relative to the pixelized panel at a different rate than the second and third lens units to vary the magnification of the system while maintaining a high image quality. The first lens unit can thus be viewed as a front, aspherical, focusing, color corrector.

The second and third lens units have the form of a telephoto lens. Thus, the second lens unit has a positive power, the third lens unit has a negative power, and the two units are widely spaced. Preferably, the spacing between the units satisfies limitation (1) above. The output of the illumination system is generally located between the second and third lens units and thus these units preferably include only glass elements which can withstand the heat generated in the vicinity of that output.

The magnitudes of the powers of the second and third lens units are generally similar and each is substantially greater than the magnitude of the power of the first lens unit.

As discussed above, the projection lenses of the invention are athermalized so that the optical performance of the system, including, in particular, the system's back focal length, does not substantially change as the projection lens is heated from room temperature to its operating temperature. More specifically, the change in the back focal length is preferably less than an amount which will significantly change the modulation transfer function (MTF) of the system, e.g., the change in the MTF at 5 cycles/millimeter should be less than about 10%. For the specific examples presented below, this MTF criterion corresponds to a change in the back focal length of less than about 0.8 millimeters. The desired thermal stabilization of the lens' focus is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by balancing positive and negative plastic optical power, while also taking into account both the location of the plastic lens elements and the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small, e.g., elements near the focus of the system, will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

Figure 1:
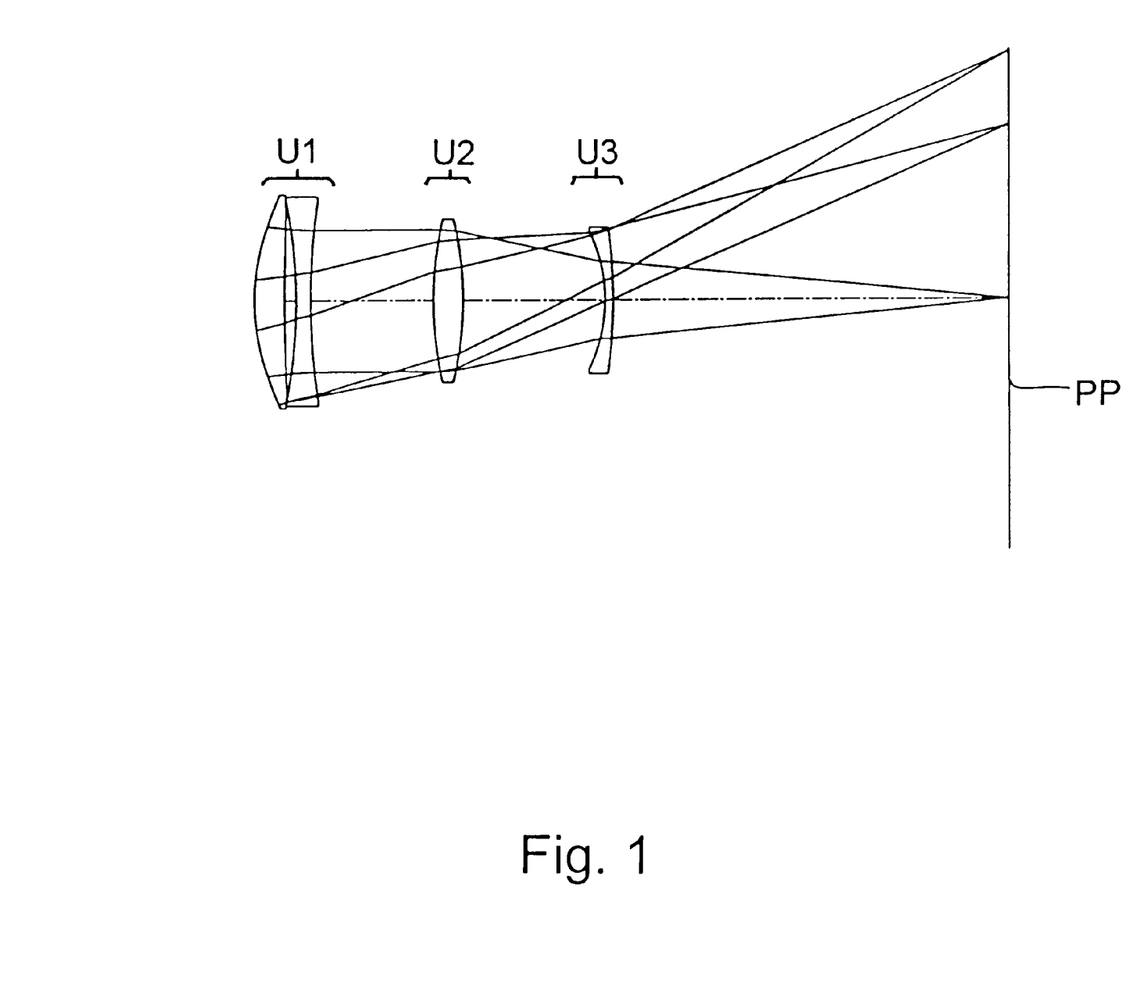
FIGS. 1–3 are schematic side views of projection lenses constructed in accordance with the invention.
Figure 2:
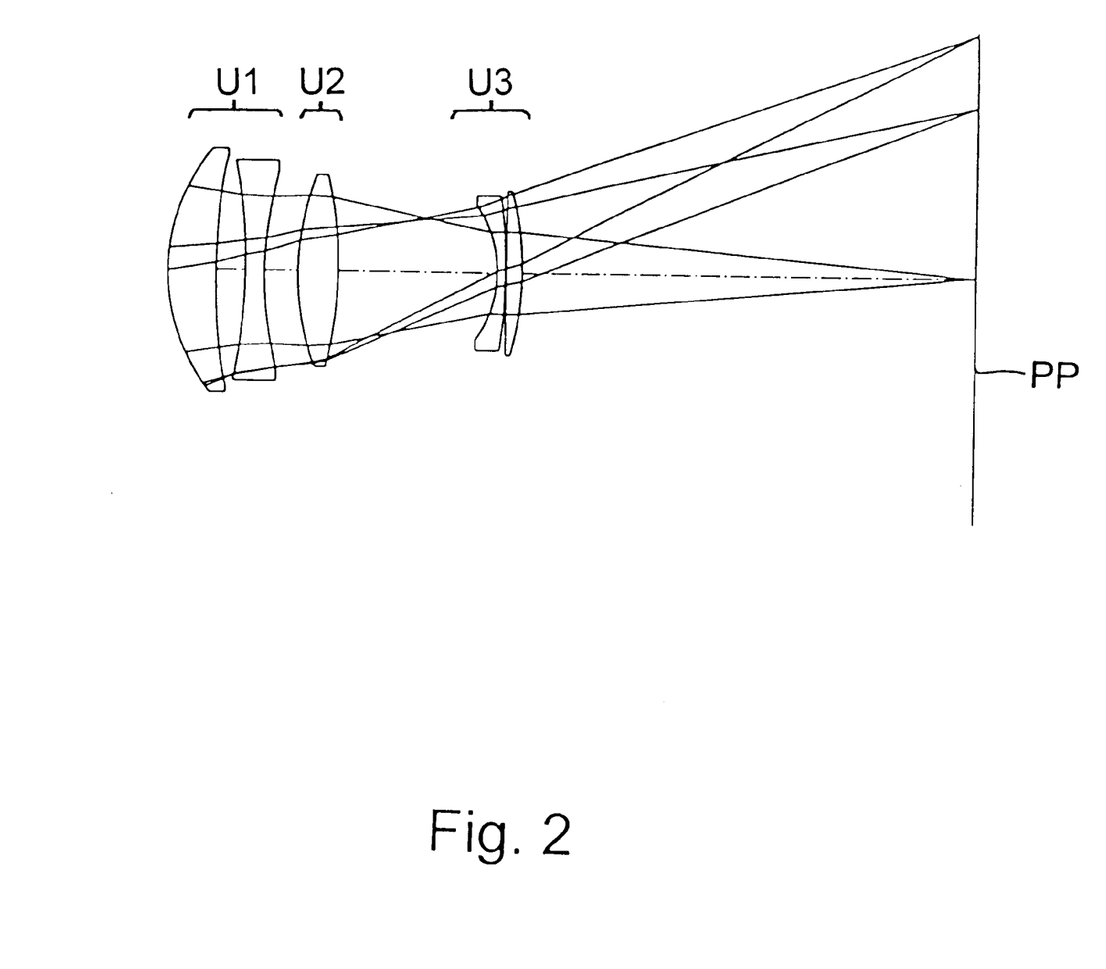
Figure 3:
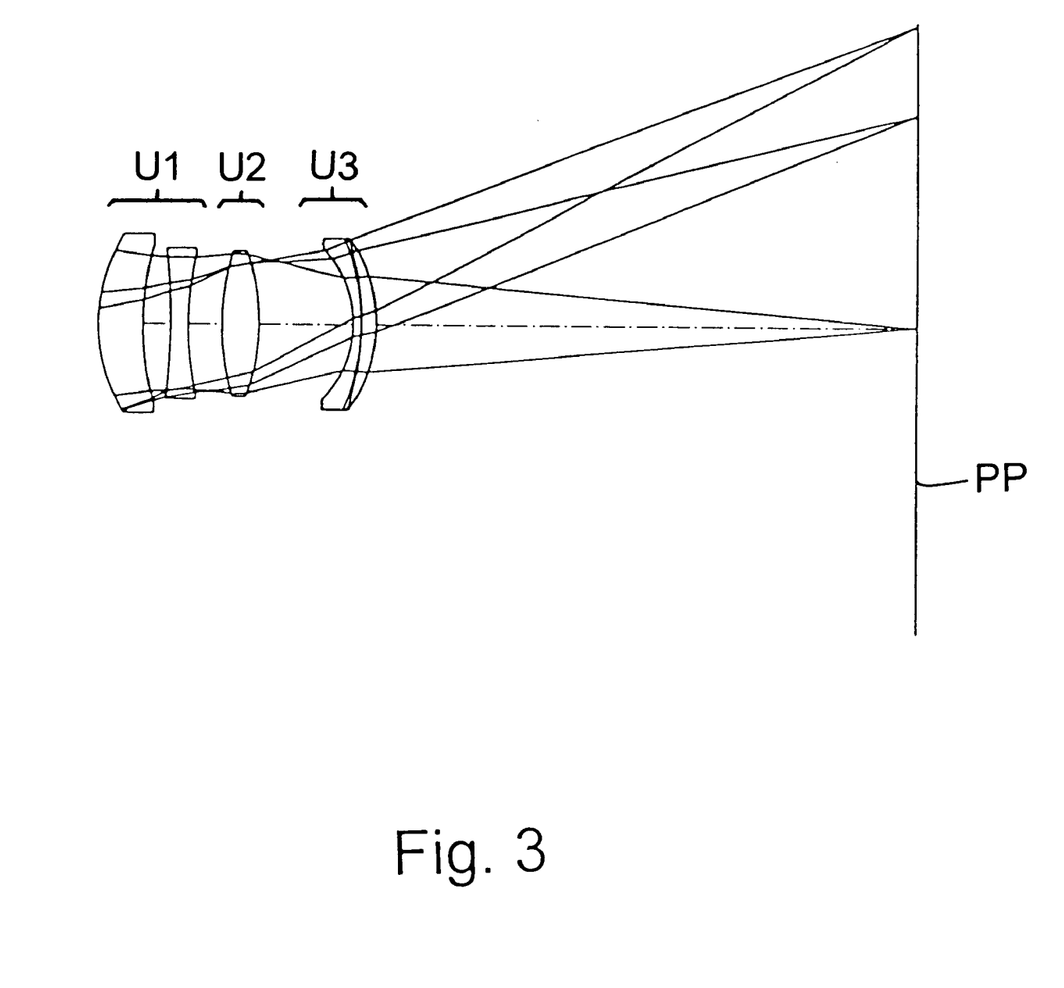

FIGS. 1 to 3 illustrate various projection lenses constructed in accordance with the invention. Corresponding prescriptions and optical properties appear in Tables 1 to 3, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero for the prescriptions of Tables 1–3.

The abbreviations used in the tables are as follows:
EFL effective focal length
FVD front vertex distance
f/ f-number
ENP entrance pupil as seen from the long conjugate
EXP exit pupil as seen from the long conjugate
BRL barrel length
OBJ HT object height
MAG magnification
STOP location of aperture stop
IMD image distance
OBD object distance
OVL overall length.

The designation "a" associated with various surfaces in the tables represents an aspheric surface, i.e., a surface for which at least one of D, E, F, G, H, or J in the above equation is not zero. All dimensions given in the tables are in millimeters. The tables are constructed on the assumption that light travels from left to right in the figures. In actual practice, the viewing screen will be on the left and the pixelized panel will be on the right, and light will travel from right to left. The pixelized panel is shown by the designation "PP" in the figures. The panel for which the lenses were designed, specifically, a LCD panel, had an effective diagonal of approximately 330 millimeters when the offset of the panel from the lens system's optical axis is included.

In Table 1, the first lens unit ($U_1$) comprises surfaces 1–4, the second lens unit ($U_2$) comprises surfaces 5–6, and the third lens unit ($U_3$) comprises surfaces 7–8. In Tables 2–3, the first lens unit ($U_1$) comprises surfaces 1–4, the second lens unit ($U_2$) comprises surfaces 5–6, and the third lens unit ($U_3$) comprises surfaces 8–11.

As discussed above, the projection lens of FIG. 1 was designed using the pseudo-aperture stop/entrance pupil technique of Betensky, U.S. Pat. No. 5,313,330. Surface 9 in Table 1 constitutes the pseudo-aperture stop. Its location corresponds to the location of the output of the illumination system.

As can be seen in the subtable labeled "Variable Spaces," the distance from the pseudo-aperture stop to the pixelized panel, i.e., the "Image Distance," is essentially constant for all focal positions (magnifications) of the projection lens system of FIG. 1. In contrast, space 8 changes for the different magnifications. For the focus positions shown, this space is negative corresponding to the illumination output being located within the space defined by the lens' front and back lens surfaces.

As also discussed above, the projection lenses of FIGS. 1–3 can be focused by changing the distance between the pixelized panel and the first, second, and third lens units while (a) holding constant the distance between the second and third lens units, and (b) varying the distance between the first lens unit and the second lens unit. As shown in Tables 1–3, the amount of movement of the first lens unit relative to the second lens unit is small compared to the overall movement of the lens system relative to the pixelized panel.

Tables 4 and 5 summarize various properties of the lens systems of the invention. The BFL values are calculated for an object at infinity along the long conjugate of the system. As shown in Table 5, each of limitations (1) through (3) is satisfied by the lens systems of FIGS. 1–3, Although specific embodiments of the invention have been described and illustrated, it is to be understood that a variety of modifications which do not depart from the scope and spirit of the invention will be evident to persons of ordinary skill in the art from the foregoing disclosure.

TABLE 1

Lens Data

| Surf. No. | Type | Radius | Thickness | Glass | Clear Aperture Diameter |
|---|---|---|---|---|---|
| 1 | a | 145.6603 | 20.00000 | ACRYLIC | 140.69 |
| 2 | a | 771.1563 | 8.16629 | | 137.81 |
| 3 | | −343.2301 | 10.00000 | STYRENE | 137.61 |
| 4 | a | 529.6310 | Space 1 | | 130.01 |
| 5 | | 243.9732 | 20.00000 | BK7 | 106.72 |
| 6 | | −243.9732 | 97.41089 | | 105.53 |
| 7 | | −105.3823 | 5.50000 | SK5 | 92.02 |
| 8 | | −366.2086 | Space 2 | | 97.35 |
| 9 | | Aperture stop | Image distance | | 67.03 |

Symbol Description a - Polynomial asphere
Even Polynomial Aspheres

| Surf. No. | D | E | F | G | H | I |
|---|---|---|---|---|---|---|
| 1 | −5.1941E-08 | 1.1394E-12 | −9.4992E-16 | −5.6960E-20 | 1.1729E-24 | −5.2932E-28 |
| 2 | −1.1391E-07 | 1.3300E-11 | −3.3639E-15 | 4.4420E-19 | −3.2536E-23 | 1.2845E-27 |
| 4 | 5.6668E-08 | −5.2761E-12 | 3.7040E-16 | −5.8822E-20 | −7.7815E-24 | 2.6646E-28 |

Variable Spaces

| Focus Pos. | Space 1 T(4) | Space 2 T(8) | Focal Shift | Image Distance |
|---|---|---|---|---|
| 1 | 84.377 | −69.197 | −0.986 | 340.005 |
| 2 | 87.132 | −33.674 | −1.516 | 340.005 |
| 3 | 85.161 | −58.998 | −1.086 | 340.005 |

SYSTEM FIRST ORDER PROPERTIES, POS 1

OBJ. HT: −5615.0 f/ 5.28 MAG: −0.0300
STOP: 0.00 after surface 9. DIA: 64.878
EFL: 514.956 FVD: 516.262 ENP: 159.421
IMD: 340.005 BRL: 176.257
OBD: −17820.4 OVL: 18336.6

SYSTEM FIRST ORDER PROPERTIES, POS 2

OBJ. HT: −1685.3 f/ 5.28 MAG: −0.1000
STOP: 0.00 after surface 9. DIA: 64.931
EFL: 515.132 FVD: 554.541 ENP: 262.591
IMD: 340.005 BRL: 214.536
OBD: −5803.75 OVL: 6358.29

SYSTEM FIRST ORDER PROPERTIES, POS 3

OBJ. HT: −3370.0 f/ 5.28 MAG: −0.0500
STOP: 0.00 after surface 9. DIA: 64.884
EFL: 515.006 FVD: 527.245 ENP: 186.716
IMD: 340.005 BRL: 187.240
OBD: −10954.5 OVL: 11481.7

First Order Properties of Elements

| Element Number | Surface Numbers | Power | f' | lpp | l'pp |
|---|---|---|---|---|---|
| 1 | 1 2 | 0.27787E-02 | 359.88 | −3.0853 | −16.334 |
| 2 | 3 4 | −0.28689E-02 | −348.56 | 2.4549 | −3.7882 |
| 3 | 5 6 | 0.41927E-02 | 238.51 | 6.6780 | −6.6780 |
| 4 | 7 8 | −0.39658E-02 | −252.15 | −1.4074 | −4.8907 |

First Order Properties of the Lens

| Focus Position Number | Power | f' | lpp | l'pp |
|---|---|---|---|---|
| 1 | 0.19419E-02 | 514.96 | −140.20 | −189.41 |
| 2 | 0.19412E-02 | 515.13 | −137.29 | −225.12 |
| 3 | 0.19417E-02 | 515.01 | −139.37 | −199.67 |

TABLE 2

Lens Data

| Surf. No. | Type | Radius | Thickness | Glass | Clear Aperture Diameter |
|---|---|---|---|---|---|
| 1 | a | 126.8687 | 33.00000 | ACRYLIC | 162.43 |
| 2 | a | 548.1152 | 20.29232 | | 152.43 |
| 3 | | −369.9293 | 13.20000 | STYRENE | 146.42 |
| 4 | a | 233.1603 | Space 1 | | 134.87 |
| 5 | | 184.6235 | 27.50000 | BK7 | 127.01 |
| 6 | | −279.5319 | 63.63133 | | 123.12 |
| 7 | | Aperture stop | 45.11486 | | 76.09 |
| 8 | | −78.9788 | 5.50000 | SK18 | 89.10 |
| 9 | | −396.7956 | 0.55000 | | 101.26 |
| 10 | | 4927.7431 | 11.00000 | F2 | 105.93 |
| 11 | | −210.3431 | Image distance | | 108.23 |

Symbol Description a - Polynomial asphere
Even Polynomial Aspheres

| Surf. No. | D | E | F | G | H | I |
|---|---|---|---|---|---|---|
| 1 | −3.0991E-08 | 2.0041E-12 | −1.9651E-16 | −4.5534E-20 | −2.6881E-24 | 1.0855E-27 |
| 2 | 1.3196E-09 | 1.6297E-11 | −3.5632E-15 | 4.6548E-19 | −2.9665E-23 | 2.1789E-27 |
| 4 | −4.6012E-08 | −6.3344E-12 | 1.4385E-15 | −8.8970E-20 | −3.9446E-23 | 4.4942E-27 |

Variable Spaces

| Focus Pos. | Space 1 T(4) | Focal Shift | Image Distance |
|---|---|---|---|
| 1 | 23.039 | −2.570 | 317.280 |
| 2 | 18.696 | −1.589 | 272.413 |

SYSTEM FIRST ORDER PROPERTIES, POS 1

OBJ. HT: −887.00 f/ 5.75 MAG: −0.1900
STOP: 0.00 after surface 7. DIA: 72.135
EFL: 513.555 FVD: 560.108 ENP: 252.606
IMD: 317.280 BRL: 242.828 EXP: −53.4854
OBD: −3406.72 OVL: 3966.83

SYSTEM FIRST ORDER PROPERTIES, POS 2

OBJ. HT: −1685.3 f/ 5.75 MAG: −0.1000
STOP: 0.00 after surface 7. DIA: 63.368
EFL: 515.056 FVD: 510.897 ENP: 247.242
IMD: 272.413 BRL: 238.484 EXP: −53.4853
OBD: −5864.56 OVL: 6375.45

First Order Properties of Elements

| Element Number | Surface Numbers | Power | f' | lpp | l'pp |
|---|---|---|---|---|---|
| 1 | 1 2 | 0.30686E-02 | 325.88 | −6.4855 | −28.020 |
| 2 | 3 4 | −0.41939E-02 | −238.44 | 5.0354 | −3.1737 |
| 3 | 5 6 | 0.45709E-02 | 218.78 | 7.3512 | −11.130 |
| 4 | 8 9 | −0.64596E-02 | −154.81 | −0.83842 | −4.2123 |
| 5 | 10 11 | 0.30911E-02 | 323.51 | 6.5011 | −0.27750 |

First Order Properties of the Lens

| Focus Position Number | Power | f' | lpp | l'pp |
|---|---|---|---|---|
| 1 | 0.19472E-02 | 513.55 | −190.24 | −291.28 |
| 2 | 0.19415E-02 | 515.06 | −198.94 | −292.56 |

TABLE 3

Lens Data

| Surf. No. | Type | Radius | Thickness | Glass | Clear Aperture Diameter |
|---|---|---|---|---|---|
| 1 | a | 90.4208 | 24.54543 | ACRYLIC | 97.73 |
| 2 | a | 175.8292 | 15.09344 | | 86.72 |
| 3 | | −359.8547 | 9.81817 | STYRENE | 82.17 |
| 4 | a | 159.2121 | Space 1 | | 78.60 |
| 5 | | 137.6614 | 20.45452 | BK7 | 79.74 |
| 6 | | −123.2003 | 7.44364 | | 78.67 |
| 7 | | Aperture stop | 45.18737 | | 72.29 |
| 8 | | −60.7926 | 4.09091 | SK18 | 82.19 |
| 9 | | −172.5408 | 0.40909 | | 93.84 |
| 10 | | −119.8987 | 8.18181 | F2 | 91.53 |
| 11 | | −84.5813 | Image distance | | 94.33 |

Symbol Description a - Polynomial asphere
Even Polynomial Aspheres

| Surf. No. | D | E | F | G | H | I |
|---|---|---|---|---|---|---|
| 1 | −1.1374E-07 | −1.5369E-11 | −4.0794E-15 | −8.8952E-19 | −1.4217E-22 | −5.0944E-26 |
| 2 | −4.3679E-09 | 7.7379E-11 | −2.1796E-14 | 8.2862E-18 | −8.2641E-22 | −2.2717E-26 |
| 4 | −8.2574E-08 | −4.9966E-11 | −3.7277E-16 | −3.8757E-18 | 1.2593E-21 | 4.3922E-26 |

Variable Spaces

| Focus Pos. | Space 1 T(4) | Focal Shift | Image Distance |
|---|---|---|---|
| 1 | 18.713 | −3.364 | 300.266 |
| 2 | 17.672 | −2.219 | 267.480 |

SYSTEM FIRST ORDER PROPERTIES, POS 1

OBJ. HT: −887.00 f/ 5.75 MAG: −0.1900
STOP: 0.00 after surface 7. DIA: 70.863
EFL: 383.676 FVD: 454.204 ENP: 97.7951
IMD: 300.266 BRL: 153.937 EXP: −50.6355
OBD: −2444.74 OVL: 2898.94

SYSTEM FIRST ORDER PROPERTIES, POS 2

OBJ. HT: −1685.3 f/ 5.75 MAG: −0.1000
STOP: 0.00 after surface 7. DIA: 63.949
EFL: 385.052 FVD: 420.376 ENP: 96.5881
IMD: 267.480 BRL: 152.896 EXP: −50.6355
OBD: −4280.01 OVL: 4700.38

First Order Properties of Elements

| Element Number | Surface Numbers | Power | f' | lpp | l'pp |
|---|---|---|---|---|---|
| 1 | 1 2 | 0.29046E-02 | 344.28 | −15.887 | −30.893 |
| 2 | 3 4 | −0.54282E-02 | −184.22 | 4.2377 | −1.8749 |
| 3 | 5 6 | 0.77648E-02 | 128.79 | 7.3030 | −6.5359 |
| 4 | 8 9 | −0.67343E-02 | −148.49 | −1.3756 | −3.9043 |
| 5 | 10 11 | 0.23669E-02 | 422.50 | 15.705 | 11.079 |

First Order Properties of the Lens

| Focus Position Number | Power | f' | lpp | l'pp |
|---|---|---|---|---|
| 1 | 0.26064E-02 | 383.68 | −41.714 | −152.94 |
| 2 | 0.25971E-02 | 385.05 | −44.441 | −153.86 |

TABLE 4

| Example | $f_0$ | $f_1$ | $f_2$ | $f_3$ | $f_{23}$ | $D_{23}$ | BFL |
|---|---|---|---|---|---|---|---|
| 1 | 514.9 | 8023.1 | 238.5 | −252.2 | 517.0 | 97.4 | 255.4 |
| 2 | 517.0 | −2279.3 | 218.8 | −318.1 | 335.7 | 108.7 | 221.2 |
| 3 | 387.3 | −577.5 | 128.8 | −247.0 | 193.6 | 52.6 | 229.8 |

TABLE 5

| Example | $D_{23}/f_0$ | $|f_1|/f_0$ | $BFL/f_0$ |
|---|---|---|---|
| 1 | 0.19 | 15.58 | 0.50 |
| 2 | 0.21 | 4.41 | 0.43 |
| 3 | 0.14 | 1.49 | 0.59 |

What is claimed is:

1. A projection lens for forming an image of an object, said lens consisting in order from its image end to its object end of:
   (A) a first lens unit having an effective focal length $f_1$ and comprising a negative lens element composed of a high dispersion material and a positive lens element composed of a low dispersion material, said first lens unit having at least one aspheric surface;
   (B) a second lens unit having a positive power;
   (C) a third lens unit spaced from the second lens unit by a distance $D_{23}$, said third lens unit having a negative power and an overall meniscus shape; and
   (D) an optional field lens; wherein:
      (i) $|f_1|/f_0 > 1.3$;
      (ii) $D_{23}/f_0 > 0.1$; and
      (iii) $BFL/f_0 > 0.3$;
      where (a) $f_0$ is the effective focal length of the combination of the first, second, and third lens units, and (b) BFL is the back focal length of the combination of the first, second, and third lens units for an object located at infinity along the long conjugate side of the projection lens.

2. The projection lens of claim 1 wherein the overall meniscus shape of the third lens unit includes a shorter radius surface and a longer radius surface, with the shorter radius surface facing the image end of the projection lens.

3. The projection lens of claim 1 wherein:

$D_{23}/f_0 < 0.3$.

4. The projection lens of claim 1 wherein:

$|f_1|/f_0 > 2.5$.

5. The projection lens of claim 1 wherein:

$BFL/f_0 > 0.4$.

6. The projection lens of claim 1 wherein the first lens unit comprises at least two aspheric surfaces.

7. The projection lens of claim 1 wherein the first lens unit comprises only plastic lens elements and the second and third lens units comprise only glass lens elements.

8. The projection lens of claim 1 wherein the lens' BFL does not change substantially as the lens is heated from room temperature to its operating temperature.

9. The projection lens of claim 1 wherein the lens has a distortion which is less than about one percent at the image.

10. The projection lens of claim 1 wherein the lens has a half field of view in the direction of the image greater than about 20°.

11. The projection lens of claim 1 wherein the object is a pixelized panel.

12. The projection lens of claim 11 wherein the lens has a lateral color aberration which is less than about a pixel at the object.

13. A projection lens system for forming an image of an object, said system comprising:
   (a) an illumination system comprising a light source and illumination optics which forms an image of the light source, said image of the light source being the output of the illumination system;
   (b) a pixelized panel which comprises the object; and
   (c) a projection lens which forms the image of the object, said lens comprising in order from its image end to its object end:
      (A) a first lens unit having an effective focal length $f_1$ and comprising a negative lens element composed of a high dispersion material and a positive lens element composed of a low dispersion material, said first lens unit having at least one aspheric surface;
      (B) a second lens unit having a positive power; and
      (C) a third lens unit spaced from the second lens unit by a distance $D_{23}$, said third lens unit having a negative power and an overall meniscus shape;
      wherein:
         (i) $|f_1|/f_0 > 1.3$; and
         (ii) $D_{23}/f_0 > 0.1$;
         where $f_0$ is the effective focal length of the combination of the first, second, and third lens units.

14. The projection lens system of claim 13 wherein said projection lens has an entrance pupil whose location substantially corresponds to the location of the output of the illumination system.

15. A projection lens system for forming an image of an object, said system comprising:
   (a) an illumination system comprising a light source and illumination optics which forms an image of the light source, said image of the light source being the output of the illumination system;
   (b) a pixelized panel which comprises the object; and
   (c) a projection lens which forms the image of the object, said lens comprising in order from its image end to its object end:
      (A) a first lens unit having an effective focal length $f_1$ and comprising a negative lens element composed of a high dispersion material and a positive lens element composed of a low dispersion material, said first lens unit having at least one aspheric surface;
      (B) a second lens unit having a positive power; and
      (C) a third lens unit spaced from the second lens unit by a distance $D_{23}$, said third lens unit having a negative power and an overall meniscus shape;
      wherein:
         (i) $|f_1|/f_0 > 1.3$;
         (ii) $D_{23}/f_0 > 0.1$; and
         (iii) the focus of the projection lens system is varied by changing the distance between the pixelized panel and the first, second, and third lens units while (a) holding constant the distance between the second and third lens units, and (b) varying the distance between the first lens unit and the second lens unit;
         where $f_0$ is the effective focal length of the combination of the first, second, and third lens units.

16. A projection lens for forming an image of an object, said lens comprising in order from its image end to its object end:

(A) a first lens unit having an effective focal length $f_1$ and comprising a negative lens element composed of a high dispersion material and a positive lens element composed of a low dispersion material, said first lens unit having at least one aspheric surface and comprising only plastic lens elements;

(B) a second lens unit having a positive power and comprising only glass lens elements; and (C) a third lens unit spaced from the second lens unit by a distance $D_{23}$, said third lens unit having a negative power, an overall meniscus shape, and comprising only glass lens elements;

wherein:
(i) $|f_1|/f_0 > 1.3$; and
(ii) $D_{23}/f_0 > 0.1$;
where $f_0$ is the effective focal length of the combination of the first, second, and third lens units.

17. A projection lens for forming an image of an object, said lens consisting in order from its image end to its object end of:

(A) a first lens unit having an effective focal length $f_1$ and comprising a negative lens element composed of a high dispersion material and a positive lens element composed of a low dispersion material, said first lens unit having at least one aspheric surface;

(B) a second lens unit having a positive power;

(C) a third lens unit spaced from the second lens unit by a distance $D_{23}$, said third lens unit having a negative power and an overall meniscus shape; and (D) an optional field lens;

wherein:
(i) the lens has a distortion which is less than about one percent at the image;
(ii) $|f_1|/f_0 > 1.3$; and
(iii) $D_{23}/f_0 > 0.1$;
where $f_0$ is the effective focal length of the combination of the first, second, and third lens units.

18. A projection lens for forming an image of an object, said lens comprising in order from its image end to its object end:

(A) a first lens unit having an effective focal length $f_1$ and comprising a negative lens element composed of a high dispersion material and a positive lens element composed of a low dispersion material, said first lens unit having at least one aspheric surface;

(B) a second lens unit having a positive power; and (C) a third lens unit spaced from the second lens unit by a distance $D_{23}$, said third lens unit having a negative power and an overall meniscus shape;

wherein:
(1) the object is a pixelized panel,
(ii) the lens has a lateral color aberration which is less than about a pixel at the object;
(iii) $|f_1|/f_0 > 1.3$; and
(iv) $D_{23}/f_0 > 0.1$;
where $f_0$ is the effective focal length of the combination of the first, second, and third lens units.

* * * * *